United States Patent
Zhou et al.

(10) Patent No.: US 9,210,451 B2
(45) Date of Patent: Dec. 8, 2015

(54) REPLICATION DECISION IN P2P VOD SYSTEMS

(75) Inventors: Yipeng Zhou, Hong Kong (CN); Zhengjia Fu, Hong Kong (CN); Dah Ming Chiu, Hong Kong (CN)

(73) Assignee: The Chinese University of Hong Kong, Hong Kong (HK)

( * ) Notice: Subject to any disclaimer, the term of this patent is extended or adjusted under 35 U.S.C. 154(b) by 359 days.

(21) Appl. No.: 13/111,786

(22) Filed: May 19, 2011

(65) Prior Publication Data

US 2012/0297432 A1 Nov. 22, 2012

(51) Int. Cl.
- H04N 21/63 (2011.01)
- H04N 21/218 (2011.01)
- H04N 21/231 (2011.01)
- H04N 21/239 (2011.01)
- H04L 29/08 (2006.01)

(52) U.S. Cl.
CPC ..... H04N 21/23116 (2013.01); H04N 21/2181 (2013.01); H04N 21/2393 (2013.01); H04N 21/23113 (2013.01); H04N 21/632 (2013.01); H04L 67/104 (2013.01)

(58) Field of Classification Search
CPC ............ H04L 67/1002; H04L 67/104; H04N 21/2181; H04N 21/632; H04N 21/23113; H04N 21/23116
See application file for complete search history.

(56) References Cited

U.S. PATENT DOCUMENTS

| | | | |
|---|---|---|---|
| 2002/0154892 A1* | 10/2002 | Hoshen et al. | 386/87 |
| 2006/0174160 A1* | 8/2006 | Kim | 714/18 |
| 2006/0190615 A1* | 8/2006 | Panwar et al. | 709/231 |
| 2006/0230107 A1* | 10/2006 | Yu et al. | 709/204 |
| 2008/0184317 A1* | 7/2008 | Khedouri et al. | 725/86 |
| 2009/0300673 A1* | 12/2009 | Bachet et al. | 725/31 |
| 2009/0327244 A1* | 12/2009 | Rizal | 707/3 |
| 2010/0100899 A1* | 4/2010 | Bradbury et al. | 725/29 |
| 2010/0250704 A1* | 9/2010 | Kittel | 709/219 |
| 2010/0306339 A1* | 12/2010 | Ling et al. | 709/213 |
| 2011/0099228 A1* | 4/2011 | Smith | 709/205 |
| 2012/0036105 A1* | 2/2012 | Souza et al. | 707/622 |
| 2013/0067528 A1* | 3/2013 | White et al. | 725/133 |

* cited by examiner

*Primary Examiner* — Pinkal R Chokshi

(74) *Attorney, Agent, or Firm* — Seed IP Law Group PLLC

(57) ABSTRACT

Provided are systems and methods for making a replication decision in a P2P VoD architecture. A system according to the present application may comprise a plurality of peers; a plurality of videos distributed over the peers; and a server maintaining a replication indicator for each of the plurality of videos. In the system, each of the peers reports a first piece of information regarding one or more first videos of the plurality of videos which are stored in the peer and a second piece of information regarding a second video of the plurality of videos which is required to be stored in the peer to the server when the peer does not have enough space for storing the second video. The server then determines, according to the first and second pieces of information and the replication indicators for the first and the second videos, whether the peer is to replace one of the first videos with the second video.

36 Claims, 7 Drawing Sheets

Algorithm 1 $x_j$ and $y_j$ update algorithm run by FCS.

1: Configuration Parameters:
2:   $T_{FCS}$:   //This update algorithm will be triggered every $T_{FCS}$ time unit.
3:   $\alpha$:   //The extent of how the calculation should be affected by history results, used in updating $D_j^{new}$.
4:   $\beta$:   //Determines the range of confidence interval.

5: Input Parameters, changing with time:
6:   $\{c_1, c_2, \ldots, c_M\}$:   //The up-to-date results of number of movie copies stored by peers.
7:   $\{A_1, A_2, \ldots, A_M\}$:   //The measurement results on the movie content receiving rate contributed by peers for each movie during the current $T_{FCS}$ time window, where $A_j = \{d_j(1), d_j(2), \ldots, d_j(n_j)\}$.

8: for $j = 1$ to $M$ do
9:   If $n_j > 0$ then
10:     //Calculate the mean $D_j$ and standard deviation $\sigma_j$ of the reported measurement results by peers, $\{d_j(1), d_j(2), \ldots, d_j(n_j)\}$ for movie $j$ during the current time window:

11:     $D_j = \sum_{s=1}^{n_j} d_j(s)/n_j$;

12:     $\sigma_j = \sqrt{\sum_{s=1}^{n_j} d_j^2(s)/n_j - D_j^2}$ ;

13:     $D_j^{new} = \alpha D_j + (1-\alpha)D_j^{pre}$;   //Updating $D_j^{new}$ by considering history values.

14:     If $D_j^{new} - R_j > \beta\sigma_j$ then
15:       //Movie $j$ is over-replicated.
16:       $y_j = c_j \times (D_j^{new} - R_j)/D_j^{new}$;   //Estimate the number of redundant copies.
17:       $x_j = 0$;
18:     else if $R_j - D_j^{new} > \beta\sigma_j$ then
19:       //Movie $j$ is under-replicated.
20:       $y_j = 0$;
21:       $x_j = c_j \times (R_j - D_j^{new})/D_j^{new}$;   //Estimate the number of inadequate copies.
22:     else
23:       //Movie $j$ is in balanced state.
24:       $x_j = 0$;
25:       $y_j = 0$;
26:     end If
27:     $D_j^{pre} = D_j^{new}$.   //Keep the history.
28:     Empty set $A_j$.   //Initiate data structure $A_j$ for the new time window.
29:   else
30:     //No peer has viewed movie $j$ in this window, gradually decrease its copy.
31:     $x_j = 0$;
32:     $y_j = 1$;
33:   end If
34: end for

Figure 11

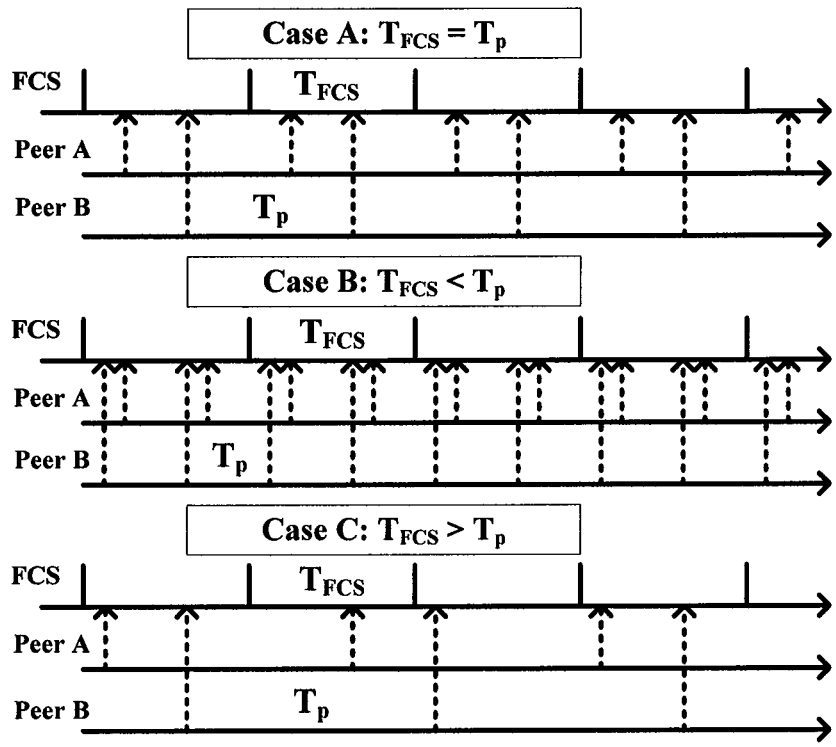

Figure 12

| Algorithm 2 Replacement decision making algorithm by FCS |
|---|
| 1: Input Parameters: |
| 2:   $Q_i$,   //Movie set currently stored by peer $i$. |
| 3:   Candidate movie $k$, |
| 4:   $\{(x_1, y_1), (x_2, y_2) \ldots, (x_M, y_M)\}$, <br>     //The up-to-date replacement indicators for each movie, maintained by FCS. |
| |
| 5:   //Find the movie $r$ in set $Q_i$ that has the largest number of redundant copies. Or, equivalently: |
| 6:   $r = \arg\max_{j \in Q_i} y_j$; |
| 7:   if $y_r \geq 1$ and $x_k \geq 1$ then |
| 8:     //Only when movie $r$ is over-replicated and movie $k$ is under-replicated, do replacement. |
| 9:     Sending back instruction of "Replacing movie $r$ with movie $k$" to peer $i$. |
| 10:     $y_r = y_r - 1$;   $x_k = x_k - 1$;   //Updating $y_r$ and $x_k$. |
| 11:   else |
| 12:     Sending back instruction of "No replacement" to peer $i$. |
| 13:   end if |

Figure 13

REPLICATION DECISION IN P2P VOD SYSTEMS

FIELD OF THE INVENTION

The present invention relates to a Peer-to-Peer Video-on-Demand (P2P VoD) technology, in particular, to making a replication decision in a P2P VoD system.

BACKGROUND OF THE INVENTION

In recent years, a P2P VoD technology has become an effective and efficient approach to distribute high-quality videos to large number of peers. As compared with a P2P living system, peers in a P2P VoD system are less likely to have same contents shared with each other. In order to compensate a lack of synchrony and offload a server in the P2P VoD system, the following two remedial features are usually used: (a) each peer is capable of uploading content different than what is currently consumed or downloaded locally; (b) peers contribute additional storage to replicate content for uploading when it is not being viewed locally. The effectiveness of these remedies depends on whether an appropriate mix of contents is placed at different peers, which is a P2P replication problem.

The P2P replication problem has been studied before, for different service models such as P2P search, file sharing, downloading and streaming VoD. For current P2P VoD systems, there are basically two solutions. The first approach formulates the problem as a combinatorial optimization problem to minimize the server load. This approach unavoidably involves large-scale information collection, and dealing with an NP-hard computational problem. Even after simplification and approximation, the solution still takes a non-trivial amount of resources, and can only be afforded once in awhile. At this scale, the parameters collected cannot be very accurate. The second approach is lazy adaptive. It replies on simple adaptive algorithms such as FIFO (First-in-First-out), LRU (Least-Recently-Used) or LFU (Least-Frequently-Used). This approach does not work well enough to offload the server for some peer access patterns.

In the P2P VoD system, an objective is to minimize a server bandwidth and satisfy users' streaming requirement at the same time. The streaming requirement means that, for a particular video, there needs to be a balance between a total supply of uplink bandwidth (i.e., a sum of server(s)' uplink bandwidth and peers' uplink bandwidth) and a total demand (i.e., the number of viewing peers multiplied by a video playback rate). In practice, the operating regime of particular interest is when the total peer uplink bandwidth is comparable to the total demand of viewing bandwidth. In this regime, ideally, the server bandwidth used is negligibly small, if the viewing demand is deterministic and known a priori, and all the peers replicate sufficient and an appropriate mix of content so as to make full use of their upload capacities. In reality, the unpredictability of user demand, and hence the imperfection in content replication and service load balancing will always result in some server load.

SUMMARY OF THE INVENTION

In one aspect of the application, provided is a system for making a replication decision in a P2P VoD architecture, comprising:
  a plurality of peers;
  a plurality of videos distributed over the peers; and
  a server maintaining a replication indicator for each of the plurality of videos,
  wherein each of the peers reports a first information regarding one or more first videos of the plurality of videos which are stored in the peer and a second information regarding a second video of the plurality of videos which is required to be stored in the peer to the server when the peer does not have enough space for storing the second video; and the server determines, according to the first and second information and the replication indicators for the first and second videos, whether the peer is to replace one of the first videos with the second video.

In another aspect of the application, provided is a method for making a replication decision in a P2P VoD architecture, comprising:
  maintaining a replication indicator, by a server, for each of a plurality of videos in the architecture;
  reporting, by a peer, a first information regarding one or more first videos of the plurality of videos which are stored in the peer and a second information regarding a second video of the plurality of videos which is required to be stored in the peer to the server when the peer does not have enough space for storing the second video;
  retrieving, by the server, the replication indicators for each of the first video and for the second video; and
  determining, according to the replication indicators for each of the first video and for the second video, whether the peer is to replace one of the first videos with the second video.

In a further aspect of the application, provided is a server for making a replication decision in a P2P VoD architecture, comprising:
  a storage maintaining a replication indicator for each of a plurality of videos in the architecture;
  a retrieving unit for retrieving, upon receiving from a peer an enquiry with a first information regarding one or more first videos of the plurality of videos which are stored in the peer and a second information regarding a second video of the plurality of videos which is required to be stored in the peer to the server, the replication indicators for each of the first video and for the second video; and
  a first determining unit for determining whether the peer is to replace one of the first videos with the second video according to the retrieved replication indicators.

According to the present application, a hybrid replication strategy that requires server's assistance in collecting and maintaining some state information is proposed. On one hand, this solution is light-weight in terms of information collection as well as computational complexity in comparison to the optimization approach. On the other hand, better performance is achieved compared with the simple adaptive replication strategies such as LFR and FIFO.

BRIEF DESCRIPTION OF THE DRAWINGS

FIG. 11 illustrates an example of pseudo codes of how the FCS determines and updates replication indicators $\{x_j, y_j\}$ for all videos.

FIG. 12 illustrates three examples of the temporal pattern of the peers reporting (Type B message) and FCS updating $\{x_j, y_j\}$, when $T_{FCS}=T_p$, $T_{FCS}<T_p$ and $T_{FCS}>T_p$, respectively.

FIG. 13 illustrates an example of pseudo codes of how the FCS makes the replacement decision.

DESCRIPTION OF THE EMBODIMENTS

Hereafter, embodiments of the present invention will be described in detail in conjunction with the accompanying drawings.

In the P2P VoD system, a plurality of videos or video segments (hereafter, referred as "videos") are distributed on a plurality of peers (peer 1, peer 2, ..., peer N). Each peer may be either a PC running a P2P-VoD software or a set-top box inside an IPTV system. A media content server and a tracker server are basic and typical components in all kinds of P2P VoD systems, thus the detailed description thereof are omitted. Each of the peers, the media content server and the tracker server is connected to Internet and may be communicated with one another via Internet.

Figure 1:
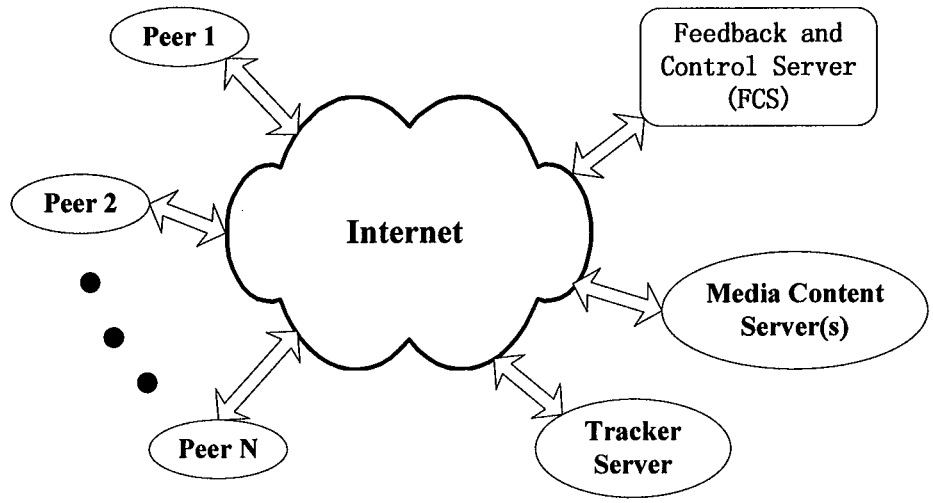
FIG. 1 illustrates a block diagram of a peer-to-peer video-on-demand system with a server for making replication decisions according to an embodiment of the present application.

According to an embodiment of the present application, a system for replication decision in a P2P VoD architecture is proposed. As shown in FIG. 1, a dedicated server FCS (Feedback and Control Server) in communication with each peer via Internet is provided in the system. The FCS may be implemented as a dedicated and separate server or incorporated in either the media content server or the tracker server. Each of the peers measures and provides its own useful information to the FCS distributedly and the FCS makes the replacement decisions and instructions for the peers centrally according to the distributed information as well as replication indicators maintained in the FCS for the peers. The replication indicator for each video indicates that if the video is in a redundancy, inadequacy or balance of replication in the system.

According to the present application, each peer (peer i, i=1, 2, ..., N, assuming N is the number of the peers) makes its viewing decision independently, say watching or playing a video k. After finishing viewing or playing the video k, the peer i will keep the video k if it has enough local storage space for storing the video k. Otherwise, it needs to make a replacement decision whether the peer i is to give up storing the video k or to replace a video r pre-stored in the peer i with the video k. Thus, the information of the videos pre-stored in the peer i and information of the video k are sent to the FCS.

It will be determined by the FCS that a video r pre-stored in the peer i is to be replaced with the video k if the replication indicator for the video k indicates an inadequacy of replication and the replication for the video r indicates a redundancy of replication. Otherwise, it will be determined that no replacement is needed and the video k is to be dropped.

As mentioned above, each peer may provide its information $Q_i$, i=1, 2, ..., N, ($Q_i$ is a set of videos stored at the peer i) and the video k which is required to be stored to the FCS when the peer finishes viewing video k but does not have enough local storage space for storing the video k. In addition, a peer may send its information $Q_i$ to the FCS when a new viewing decision to start/switch to different videos has been made. Similarly, when the local stored videos/media contents have changed (video replacement happens), an updated $Q_i$ may be also sent to the FCS so that FCS can keep the information and thus the replication indicators updated. Also, when a peer enters/leaves the system (becomes online/offline), it may also notify the FCS and also provide its a information.

Upon receiving from the peer i the information $Q_i$ and k required to be stored, the FCS retrieves replication indicators for each of the videos in $Q_i$ and the video k as mentioned above. If the replication indicator for the video k indicates an inadequacy of replication, and the replication indicator for one of the videos in $Q_i$ indicates a redundancy of replication, the FCS will determine that the one video with a replication indicator indicating a redundancy of replication is to be replaced by the video k. Otherwise, the FCS will determine that no replacement is to be made and the video k is to be dropped. Preferably, if the replication indicator for the video k indicates an inadequacy of replication, and replication indicators for more than one of the videos in a indicate a redundancy of replication, the FCS will determine that the one of the videos with a replication indicator indicating a largest redundancy of replication is to be replaced by the video k.

Hereinafter, the determination of the replication indicators conducted by the FCS will be discussed.

In addition to the information $Q_i$, each peer also provides its downloading rate to the FCS. Generally, the downloading rate is provided periodically. Each peer is configured to measure its downloading rate received from other peers other than from the media content server. The measurement results may be averaged and sent to the FCS every $T_p$ time unit.

The FCS then determines the replication indicator for each video according to the downloading rates received from the peers so as to judge which video(s) has excessive serving bandwidth contributed by peers (over-replicated or redundantly replicated) and which video(s) is suffering insufficient bandwidth (under-replicated or inadequately replicated).

Assuming there are N peers and M videos in the system, the FCS may receive the information $(Q_1, Q_2, \ldots, Q_N)$ from the peers as discussed above. For each peer i, the information $Q_i$ may indicate a set of videos stored at the peer i. According to the information $(Q_1, Q_2, \ldots, Q_N)$, the FCS is aware of current numbers $(c_1, c_2, \ldots, c_M)$ of copies stored in the system for each video j.

Meanwhile, the current downloading rate $d_j$ for downloading each video j from peers other than the media content server is measured and reported periodically by all the peers that are watching or playing the video j in a distributed manner. Measurement results are collected by the FCS over a time window $T_{FCS}$ and the nth measurement result reported by peers watching or playing the video j is denoted by $d_j(n)$. Based on the measurement results, a mean $D_j$ and a standard deviation $\sigma_j$ of the downloading rates for the video j are obtained respectively.

A desired or required playback rate $R_j$ for each video j is predetermined. In fact, the playback rate $R_j$ is a time-invariant and pre-known value, which may be provided by the media content provider/service provider.

According to an embodiment, a replication indicator for the video j may be determined by comparing the mean $D_j$ with the desired playback rate $R_j$. In particular, if the mean $D_j$ is larger than the desired playback rate $R_j$, it is determined that the replication of the video j is in a redundant status. If the mean $D_j$ is less than the desired playback rate $R_j$, it is determined that the replication of the video j is inadequate. If the mean $D_j$ is equal to the desired playback rate $R_j$, it is determined that the replication of the video j is in a balanced status.

As an example, the replication indicator for each video j may be represented by an indicator pair $\{x_j, y_j\}$, j=1, 2, ..., M, in which $x_j$ and $y_j$ may represent a desired positive adjustment and a negative adjustment to the number of copies of video j stored in the system respectively. The indicator pair may be computed by the FCS once every $T_{FCS}$ time unit. During a time window $T_{FCS}$, when a peer needs to make the video replacement decision, it will send required information to the FCS. The required information includes its stored video set $Q_i$ and identifier of the candidate video k to store.

On receiving such required information, the FCS will make the replacement decision based on $Q_i$, identifier of the video k, and the replication indicator pairs $\{x_j, y_j\}$, j=1, 2, ..., M. As stated above, the FCS will make replacement decision and instruct the peer to do or not to do the replacement. In the mean time, the FCS may update the values of the indicator pairs $\{x_j, y_j\}$, j=1, 2, ..., M, after the replacement.

It should be noted that, the FCS proposed by the present application is an abstraction of a functional module. It can be deployed in a separated server or added as a functional module in the tracker server. Alternatively, the FCS may be added as a functional module in the media content server.

Figure 2:
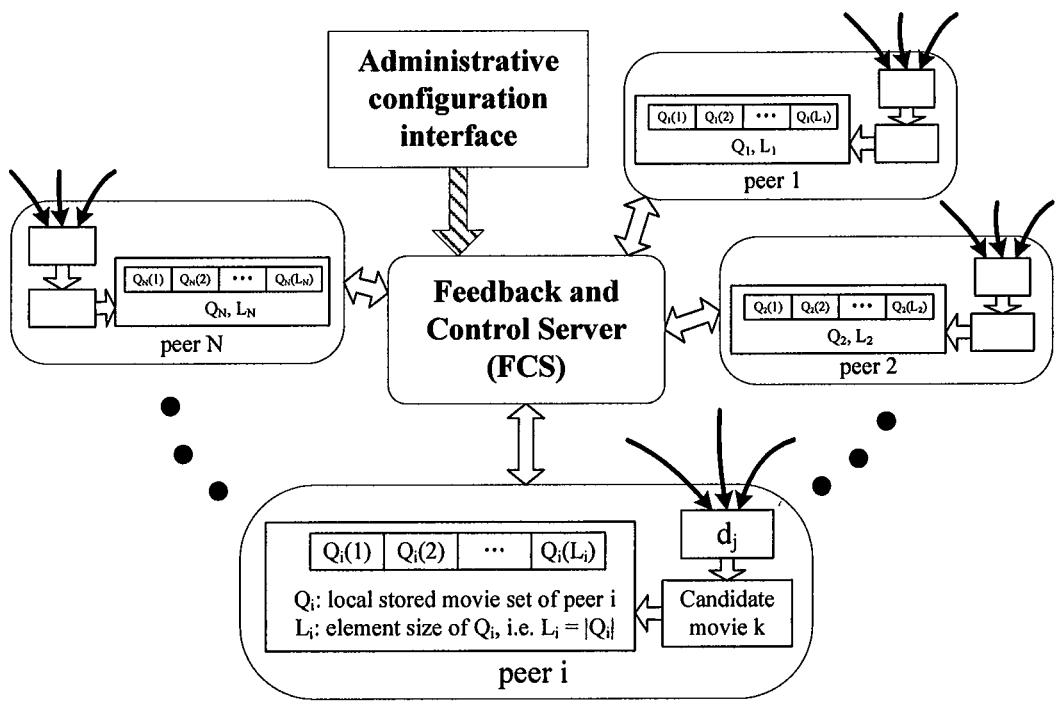
FIG. 2 illustrates an interaction and connection pattern between the peers, service provider/administrator and the FCS in the system of FIG. 1.

FIG. 2 illustrates an interaction and connection pattern between peers, service provider/administrator and the FCS. The service provider/administrator may control and configure parameters of the FCS directly, which will be discussed later. All the peers are connected to and in communication with the FCS, so that when a peer needs to make the content replacement decision, it is able to get assists from the FCS by providing adequate information. On the other hand, in order to make good decision for peer's request, the FCS needs to collect useful information from all the peers from time to time or periodically.

As shown in FIG. 2, each peer i has a local storage, which may store at most $L_i$ videos or equivalently media contents. When the storage is not fully used, the peer i will directly store all contents it has viewed. After the storage is full, when a new content (i.e., the candidate video k) has been viewed, the peer needs to make a replacement decision that either it gives up storing the video k or replaces some pre-stored video with the video k.

Figure 3:
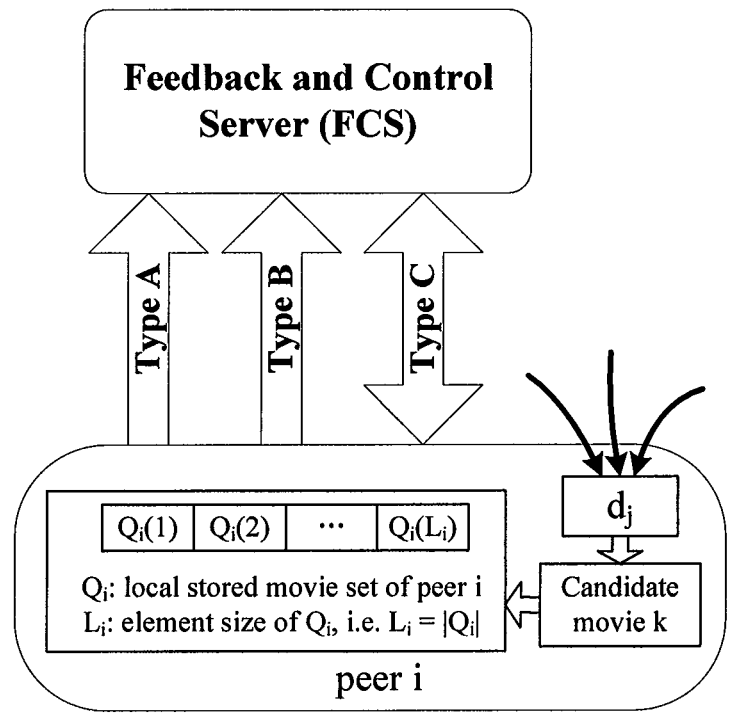
FIG. 3 illustrates three types of information exchange between the peers and the FCS.

FIG. 3 illustrates three types of information exchange (Type A, B and C) between peers and the FCS according to the application.

Type A: Information Report from Peers to FCS

This type of information exchange is triggered by any client peer whenever there are changes on its local storage set $Q_i$, i=1, 2, ..., N. In addition, when a peer leaves (become offline) or re-enters (become online) the system, the Type A message will also be sent to the FCS. Therefore, the Type A message should be sent from peers to the FCS as long as there are events cause the changes on the number of copies of each video (c1, c2, ... $c_M$) in the P2P storage.

When the Type A message is received by the FCS, it immediately updates two sets of information, i.e., $Q_i$, i=1, 2, ..., N and $c_j$, j=1, 2, ... M. In fact, $c_j$ is inferred from $Q_i$ by applying the following calculation:

$c_j = \Sigma_{\{i=1 \; to \; N\}} I(Q_i, j)$, where $I(S,x)=1$ if $x \in S$, else 0.

The parameters $c_j$, j=1, 2, ..., M are important system state information which may be used by the FCS to make the replacement decision.

Type B: Information Report, from Peers to FCS

This type of information exchange is designed for peers to report the measurement results on video downloading rate $d_j$, j=1, 2, ..., M. It may be triggered periodically and the period $T_p$ may be a configurable parameter set by the service provider/administrator.

As shown in FIG. 3, when a peer is watching or playing a video j, it conducts measurements on the data downloading rate of video j only received from all the other peers, i.e., excluding data received from the Media Content Server(s). In particular, during each time window of length $T_p$ when watching or playing the video j, the peer counts the size of the video content received from other peers. At the end of each time window, the peer calculates the average downloading rate from peers as the total size divided by $T_p$ and then sends it to the FCS in a Type B message.

Figure 4:
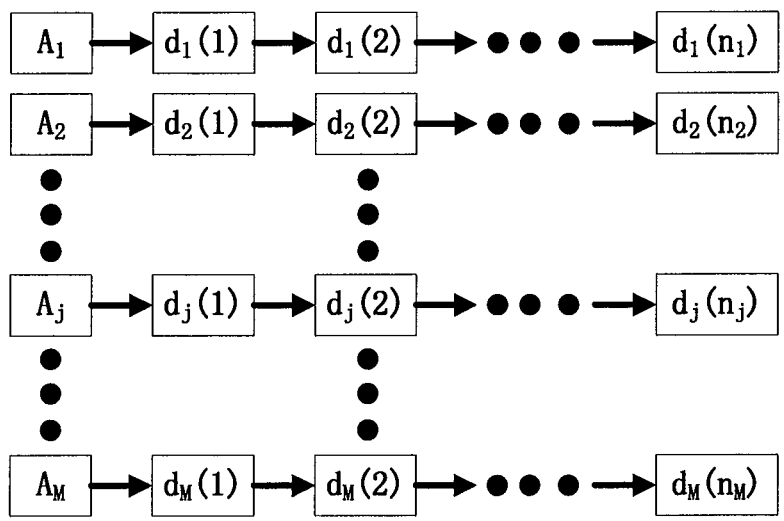
FIG. 4 illustrates an example of a set of data structure maintained by FCS to store downloading rates $d_j$ received from peers.

In order to collect the downloading rate information from peers continuously, the FCS maintains a set of data structures such as arrays, queues, lists and etc. Herein, arrays ($A_1, A_2, ..., A_M$) are taken as an example. For each video j stored in the system, an array $A_j$ is maintained. Hence, there are M Arrays in all, where M is the total number of videos in the system. An example of the data structure is illustrated in FIG. 4.

As stated above, the measurement results are used for calculating the replacement indicators $\{x_j, y_j\}$, j=1, 2, ..., M, for each video j by FCS. The updating to the replacement indicators $\{x_j, y_j\}$ may be triggered by the FCS every $T_{FCS}$ time unit.

According to an embodiment, the arrays ($A_1, A_2, ..., A_M$) may be cleared and initiated to an empty state at the beginning of each $T_{FCS}$ time window. During the time window, when a Type B message is received by the FCS from a peer with $d_j$ (i.e., the peer is watching and measuring on the video j), the element $d_j$ will be appended to the Array $A_j$ and the total size of the Array $A_j$, denoted as $n_j$, will be increased by 1. At the end of each time window, the FCS will update the $x_j$ and $y_j$ based on the collected information including the measured and reported data sets ($A_1, A_2, ..., A_M$).

Type C: Information Exchange Between Peers and FCS

Type C information exchange is designed for making a video content replacement decision enquiry by peers and a response by FCS. There are three steps for each Type C information exchange.

Figure 5:
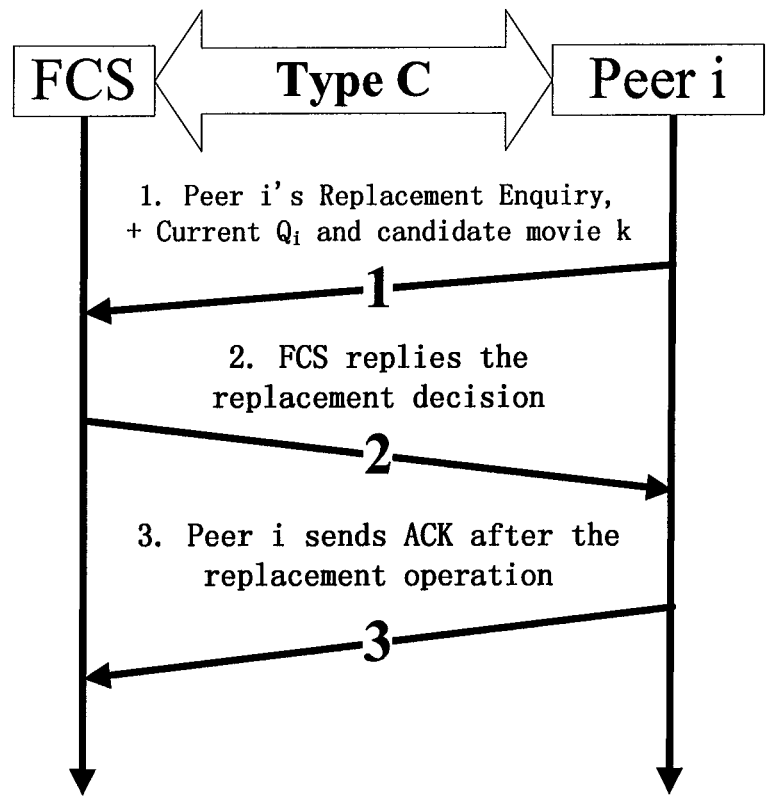
FIG. 5 illustrates details of the Type C interaction between the peers and the FCS.

As an example, FIG. 5 illustrates details of the three steps. When a peer i faces the replacement situation, i.e., a new video has just been viewed and its local storage $Q_i$ is not enough to store the new video, it may send an enquiry to the FCS through the Type C message. In the message, peer i also needs to provide information $Q_i$ of the video set currently stored by it and the candidate video k for replication.

After receiving the enquiry from the peer i, the FCS may make the replacement decision and send back the result to the peer. Then, the peer may send an ACK on the replacement decision to the FCS. As shown in FIG. 5, after receiving the replacement decision from the FCS, the peer immediately sends an ACK to the FCS indicating that it has successfully got the replacement decision. After that, the peer follows the replacement instruction, i.e., either replaces an existing video r with the candidate video k, or just gives up the replacement and drops the video k.

Figure 6:
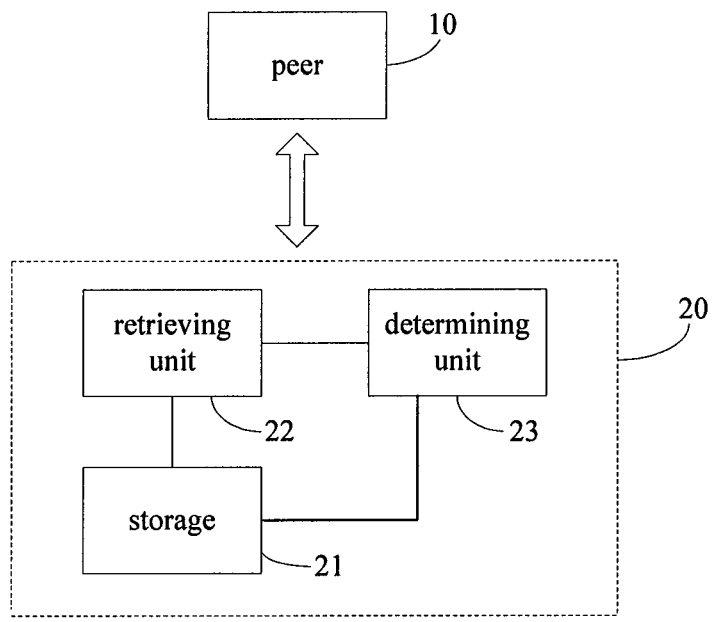
FIG. 6 illustrates a block view of the FCS according to an embodiment of the present application.

FIG. 6 illustrates a block view of the FCS according to an embodiment of the present application. As shown, the FCS 20 comprises storage 21, a retrieving unit 22 and a first determining unit 23. The storage 21 stores a replication indicator for each video in the P2P VoD system. When an enquiry from the peer 10 with information regarding videos stored in the peer 10 and information regarding a video k required to be stored in the peer 10 is received by the FCS 20, the retrieving unit 22 retrieves the replication indicators for each of video stored in the peer 10 and for the video k. According to the retrieved indicators, the first determining unit 23 determines whether the peer 10 is to replace a video r stored in the peer 10 with the video k.

In particular, if the replication indicator for the video k indicates that it is under-replicated, and the replication indicator for a pre-stored video r indicates that it is over-replicated, the first determining unit 23 may determine that the peer 10 is to replace the video r with the video k. Otherwise, the determining unit 23 may determine that no replacement is to be made. If the video k indicates an under-replicated status and several pre-stored video have replication indicator indicating an over-replicated status, the video having a replication indicator indicating a most redundancy of replication may be selected to be replaced with the video k.

After replacing a video r with the video k, the peer may notify the FCS of the replacement. Then, the first determining unit 23 may update the replication indicators for both videos stored in the storage 21, respectively.

Figure 7:
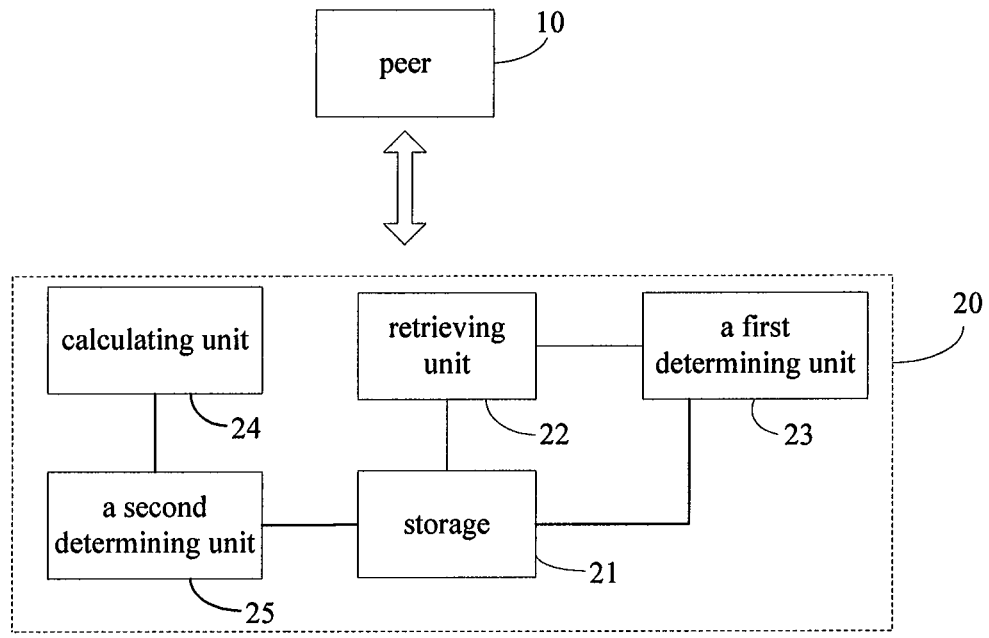
FIG. 7 illustrates a block view of the FCS according to another embodiment of the present application.

According to an embodiment, each peer in the system may report to the FCS respective currently downloading rate for each video from other peers rather than the media content server. As shown in FIG. 7, the FCS 20 may further comprise a calculating unit 24 and a second determining unit 25. For each video, the calculating unit 24 may calculate an average or predicted downloading rate for the video according to the downloading rates reported by all peers that are watching or playing the video. The second determining unit 25 may determine the replication indicator for each video according to the downloading rates calculated by the calculating unit 24. The replication indicators determined by the determining unit 25 is then stored in the storage 21.

According to an embodiment, the peers report their downloading rates periodically. Thus, the calculating unit 24 and the second determining unit 25 work periodically.

Figure 8:
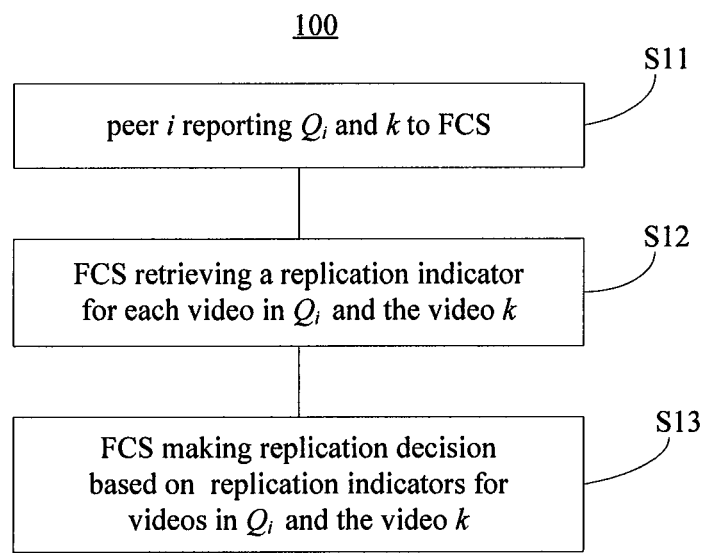
FIG. 8 illustrates a flow chart of the method for making replication decision according to an embodiment of the present application.

A method for making replication decisions in a P2P VoD system according to the present application is shown in FIG. 8. According to the method 100, a replication indicator for each video in the system is maintained in the FCS. When a video k has been viewed by a peer i and is required to be stored in the peer i, if there is not enough space for storing this video, the peer i reports information a regarding videos stored therein and information k regarding the video required to be stored to the server at step S11. Upon receiving such information, the FCS retrieves the replication indicators for each of the stored videos and for the video k at step S12. Then, the FCS determines whether the peer i needs to replace one of the pre-stored videos with the video k.

Figure 9:
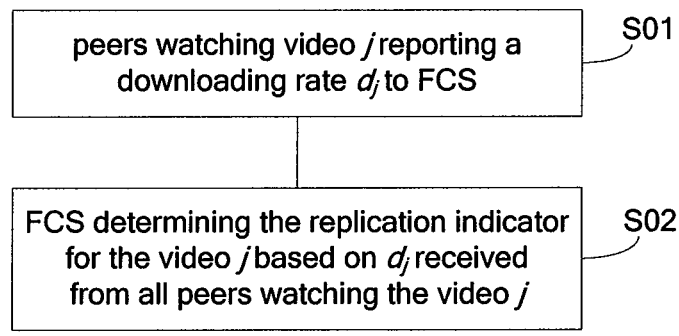
FIG. 9 illustrates steps for determining of the replication indicators in the method of FIG. 8 according to an embodiment of the present application.

As stated above, the replication indicator for each video may indicate a redundancy, inadequacy or balance of replication of the video. The determination of the replication indicators according to an embodiment of the present application is illustrated in FIG. 9.

For determining the replication indicators for peers, at step S01, each peer reports a current downloading rate for a video it is watching or playing. Then, the FCS determines the replication indicator for each video at step S02 according to the downloading rates for the video reported by all the peers.

In particular, the replication indicator for each video may be determined by calculating an average downloading rate or a predicted downloading rate for the video according to the downloading rates for the video reported by all peers that are watching or playing the video, and determining the replication indicator for each video based on a comparison between the calculated downloading rate and a predetermined desired rate or rate range for the video. An example for calculating the average downloading rate or the predicted downloading rate will be discussed with reference to FIG. 11.

According to an embodiment, each of the peers may report its current downloading rate for each video it is watching or playing periodically. Also, the FCS may determine the replication indicator for each video periodically. According to embodiments of the present application, the reported downloading rate is a rate for downloading the video from other peers rather than the media content server.

Figure 10:
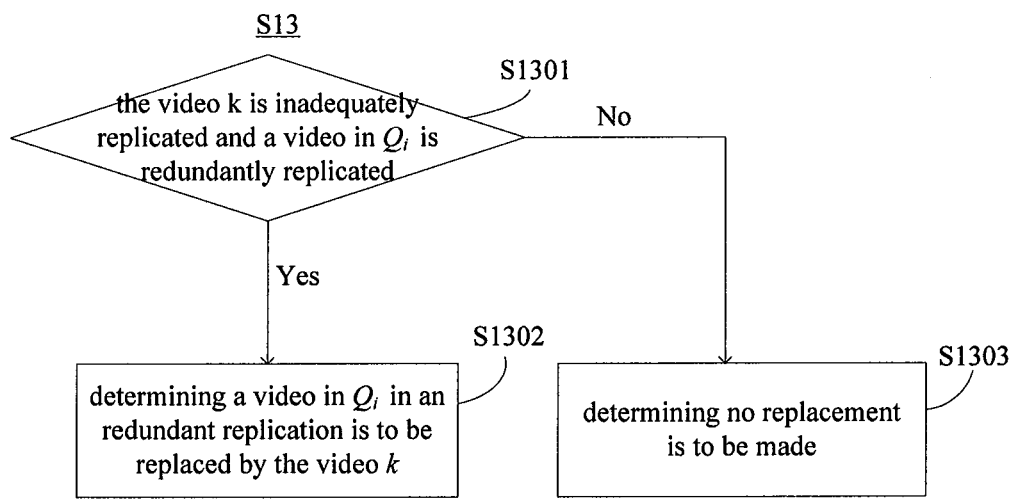
FIG. 10 illustrates steps for making replacement decision in the method of FIG. 8 according to an embodiment of the present application.

FIG. 10 illustrates sub-steps of the step S13 in the method of FIG. 8 according to an embodiment of the present application. As shown, at step S1301, it is determined 1) whether the replication indicator for the video k indicates an under-replicated status, and 2) whether a video r in $Q_i$ has a replication indicator indicating an over-replicated status. If both conditions are satisfied, it is determined at step S1302 that the pre-stored video r is to be replaced by the video k. Otherwise, it is determined at step S1303 that the no replacement is to be made. If several videos in a have replication indicators indicating an over-replicated status, preferably, the video having a replication indicator indicating a most redundancy of replication is selected to be replaced. After a replacement is made, the server may adjust the replication indicators for the video k and for the video r, respectively, to keep the replication indicators for videos updated. An example of pseudo codes implemented to make the replacement decision will be discussed with reference to FIG. 12.

FIG. 11 illustrates an example of pseudo codes of how the FCS determines and updates $x_j$ and $y_j$ for all videos every $T_{FCS}$ time unit so that the indicators $\{x_j, y_j\}$ will follow up with a change of the dynamic scenarios, e.g., video popularity churn, peer churn and etc.

As shown in FIG. 11, the following three configuration parameters may be preset:

a) $T_{FCS}$, a period for updating the replication indicators. There may be three relationships between $T_{FCS}$ and $T_P$, the measurement and report period of peers' downloading rate as described above. When $T_{FCS} > T_p$, the update period for $\{x_j, y_j\}$, j=1, 2, ..., M, by FCS is larger than that of reporting on $d_j$, j=1, 2, ..., M, by peers. On average, in each time window $T_{FCS}$, the total number of reports on $d_j$, j=1, 2, ..., M, will be larger than the total number of peers, N. Theoretically, the ratio of total number reports/N should be equal to $T_{FCS}/T_p$. Similar analysis can also be inferred for the other two cases, i.e., $T_{FCS} < T_p$ and $T_{FCS} = T_p$. The three examples of the temporal patterns of peers' reporting and FCS' updating are illustrated in FIG. 12. As shown in FIG. 12, it is assumed that there are only two peers, peer A and peer B with the same Type B reporting period $T_p$. If $T_{FCS}$ is too small, (i.e., $T_{FCS} < T_p$), the information used for updating $\{x_j, y_j\}$, j=1, 2, ..., M, will be inadequate, hence leading to the inaccurate values of $\{x_j, y_j\}$, j=1, 2, ..., M. On the other hand, if $T_{FCS}$ is too large, ($T_{FCS} > T_p$), it will be such a long time before each updating that it causes slow responses of the FCS to the changes of the situation, e.g., video popularity churn, peer churn, etc. Therefore, in a real implementation, the value of $T_{FCS}$ is preferably selected to be a proper value, a little larger than $T_p$.

b) $\alpha$, the extent of how the calculation should be affected by a history results, $D_{jpre}$. As shown in code line 13 in FIG. 11, a value of $D_{jnew}$ may be derived from two parts, the mean of the recent measurement results $D_j$ with weight a and the history result $D_{jpre}$ with weight $(1-\alpha)$. It is easy to infer that when $\alpha$ is close to 1, $D_{jnew}$ will be updated by more recent measured and reported data. When $\alpha$ is close to 0, the $D_{jnew}$ takes more weight on history results. A proper $\alpha$ may have two aspects: in one aspect, $D_{jnew}$ should reflect more recent dynamic state information (average downloading rate from peers of each video, $D_j$, $j=1, 2, \ldots, M$). In the other aspect, it may alleviate the negative influence caused by the noise and biases in the measurements.

c) $\beta$, determines the confidence interval of the measured data mean $D_j$ and target value $R_j$. As shown in FIG. 11, the basic idea of the updating is to achieve a balanced state for each video j, i.e., make $D_j$ equal to $R_j$, which means, peers can download the video contents from other peers just at the required video playback rate $R_j$, $j=1, 2, \ldots, M$. In this manner, the media content server will lead to the minimum server load or cost (consumed upload bandwidth and computational cost). Meanwhile, all the peers viewing requests are satisfied.

Since $D_{jnew}$ comes from both history results and recent measured data, there would be measurement biases and noises. Usually, in statistics, a range $(R_j-\beta\sigma_j, R_j+\beta\sigma_j)$ as the confidence interval. If $D_{jnew}$ belongs to this range, it is believed with high confidence that video j already reaches the balanced state. Otherwise, the balanced state is not achieved and the adjustment on the video copies of video j is necessary. This idea is revealed at line 14, line 18 and line 22 in FIG. 11.

As shown in FIG. 11, the updating is iterated for each video (line 8). In each iteration, there are three steps:

At step 1, a mean of the recent measured data $D_j$, a standard deviation $\sigma_j$, and $D_{jnew}$ may be calculated based on the measured and reported data $A_j = \{d_j(1), d_j(2), \ldots, d_j(n_j)\}$. The calculation is usually standard, except that there is no viewing, hence measurement and reporting, on video j during the current time window. The handling for this exceptional case is in code from line 29-32. In particular, the indicator for such a video j may be set as $x_j=0$ (No inadequate copy) and $y_j=1$ (One redundant copy). When working with the replacement decision making algorithm, this causes removing one copy of such video j at the lowest priority.

At step 2, the three conditions of each video j is determined (line 14, line 18 and line 22 in FIG. 11). If $D_{jnew} > R_j + \beta\sigma_j$, the video j is considered as in the over-replicated state. Because there must be too many copies in the P2P storage, and the received downloading rate from peers for this video would be much higher than the required $R_j$. If $D_{jnew} < R_j - \beta\sigma_j$, the video j is considered as in the under-replicated state. Otherwise, the video j is considered as in the balanced state.

At step 3, replication indicators $\{x_j, y_j\}$ are adjusted. In particular, if a video j is in the over-replicated state, it may be set that $x_j=0$ (no inadequate copies) and $y_j=c_j*(D_{jnew}-R_j)/D_{jnew}$ (estimated number of redundant copies). For this estimation, it is assumed that 1) $D_{jnew}$ approximates the downloading rate of video j received from other peers, and 2) all peers that have stored the video j have contributed their bandwidth in a (Process Fair Sharing) PFS scheme. Under these assumptions, $y_j*D_{jnew}=c_j*(D_{jnew}-R_j)$, (Line 16 and Line 17 in FIG. 11). Similarly, when the video j is in the under-replicated state, it is estimated that $x_j=c_j*(R_j-D_{jnew})/D_{jnew}$ and $y_j=0$ (no redundant copies) (Line 20 and Line 21 in FIG. 11). If a video is already in the balanced state, then nothing should be adjusted. (Line 24 and Line 25 in FIG. 11)

After the updating on each $\{x_j, y_j\}$, the $D_{jnew}$ may be kept as a history result for calculation in the next round (Line 27) and the data structure $A_j$ that stores the measured and reported downloading rate from peers may be initiated for future use (Line 28).

It is noted that, the indicator pairs $\{x_j, y_j\}$, $j=1, 2, \ldots M$, are just for easy description in this application, wherein both $x_j$ and $y_j$ are natural numbers. In fact, they are exclusive to each other. It is straightforward that videos cannot belong to both under-replicated and over-replicated states at the same time. Therefore, in the implementation, each indicator pair can be represented by a single number. For example, a signal indicator $z_j$ may be used, wherein $z_j = y_j$ when $y_j > 0$; and $z_j = -x_j$ when $x_j > 0$; and $z_j = 0$ when $x_j = y_j = 0$.

In addition, as illustrated in FIG. 2, besides the updating as stated above, the indicators $\{x_j, y_j\}$, $j=1, 2, \ldots M$, may also be manually configured and adjusted by the service provider/administrator through administrative configuration interface. For example, when the service provider wants to remove an obsolete video (say video g) from the content program list and will not provide service for it any more, then the adjustment $x_g=0$ and $y_g=$a large positive value, may be configured. In another example, when the service provider wants to increase the number of video copies for some newly online video (say video h) in a short time, then the adjustment $x_h=$a large positive value and $y_h=0$, may be configured.

FIG. 13 illustrates the pseudo code of how FCS helps peers to make the video replacement decision. As shown in FIG. 13, the input information for this determination includes: $Q_i$, the video set currently stored at peer i; the candidate video k for replication and the up-to-date values of $\{x_j, y_j\}$, $j=1, 2, \ldots, M$. The basic idea of the replacement decision making strategy is simple, trying not to keep the video with the largest number of redundant video copy in P2P storage. As shown in FIG. 13, a video r, which has the largest number of redundant video copies, i.e., $y_r \geq y_j$, for all $j \in Q_i$, is found out from locally stored video set $Q_i$. Only when the video r has more than one redundant copy ($y_r \geq 1$) and at the same time video k is lacking of video copy ($x_k \geq 1$) in P2P storage, the replacement operation should be conducted. Alternatively, the replication state of the video k is determined first. Only when the video k is under-replicated, a video r with largest number of redundant video copies is to be found. Then, no matter whether replacement should be conducted or not, the FCS may respond to the peer's enquiry. If a video r should be replaced with the video k, $y_r$ and $x_k$ should be updated by the FCS right after the replacement is made and a response is sent from the peer, so that the replacement decisions of subsequent enquiries will not be affected.

Features, integers, characteristics, or combinations described in conjunction with a particular aspect, embodiment, implementation or example disclosed herein are to be understood to be applicable to any other aspect, embodiment, implementation or example described herein unless incompatible therewith. All of the features disclosed in this application (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments and extends to any novel one, or any novel combination, of the features disclosed in this specification (including any accompanying claims, abstract and drawings), or to any novel one, or any novel combination, of the steps of any method or process so disclosed.

The invention claimed is:

1. A system for making a replication decision in a Peer-to-Peer Video-on-Demand (P2P VoD) architecture, the system comprising:
    a plurality of peers;
    a server maintaining a replication indicator for each of a plurality of videos distributed over the peers, wherein the replication indicator for each video indicates a redundancy, inadequacy or balance of replication of the video;
    wherein each of the peers reports to the server first information regarding one or more first videos of the plurality of videos which are stored in the peer and reports second information that includes a downloading rate of a second video of the plurality of videos which has been viewed at the peer; and
    wherein the server determines, according to the first information, the second information and the replication indicators for the one or more first videos and the second video, whether the peer is to replace at least one of the one or more first videos with the second video when the peer does not have enough space for storing the second video; and
    wherein the server determines the replication indicator for the second video using the downloading rates for the second video reported to the server by all the peers at which the second video has been viewed.

2. The system of claim 1, wherein the server determines an average downloading rate for each video according to the downloading rates for the video reported by all the peers at which the video has been viewed, and determines the replication indicator for each video according to a comparison between the average downloading rate for the video and a predetermined desired rate or range for the video.

3. The system of claim 1, wherein the server determines a predicted downloading rate for each video according to the downloading rates for the video reported by all the peers at which the video has been viewed, and determines the replication indicator for each video according to a comparison between the predicted downloading rate for the video and a predetermined desired rate or range for the video.

4. The system of claim 1, wherein the server determines that the peer is to replace one of the first videos with the second video, if the replication indicator for the second video indicates an inadequacy of replication, and the replication indicator for the one of the first videos indicates a redundancy of replication.

5. The system of claim 4, wherein the one of the first videos has a replication indicator indicating a most or largest redundancy of replication.

6. The system of claim 1, wherein, the server determines that no replacement is to be performed by the peer, if either the replication indicator for the second video does not indicate an inadequacy of replication, or the replication indicator for none of the first videos indicates a redundancy of replication.

7. The system of claim 4, wherein the server updates the replication indicators for the second video and the one of the first videos, respectively, after the peer replaces the one of the first videos with the second video.

8. The system of claim 1, wherein each of the peers reports its current downloading rate for each video it is watching periodically.

9. The system of claim 8, wherein the server determines the replication indicator for each video periodically.

10. The system of claim 1, wherein the reported downloading rate is a rate for downloading the video from other peers.

11. A method for making a replication decision in a Peer-to-Peer Video-on-Demand (P2P VoD) system, the method comprising:
    maintaining a replication indicator, by a server, for each of a plurality of videos in the system, wherein the replication indicator for each video indicates a redundancy, inadequacy or balance of replication of the video;
    reporting to the server, by a peer, first information regarding one or more first videos of the plurality of videos which are stored in the peer and reporting second information including a downloading rate of a second video of the plurality of videos which has been viewed at the peer;
    retrieving, by the server, the replication indicators for each of the one or more first videos and for the second video;
    determining, by the server, according to the first information, the second information, and the replication indicators for each of the first video and for the second video, whether the peer is to replace at least one of the one or more first videos with the second video when the peer does not have enough space for storing the second video;
    reporting to the server, by each peer watching the second video, a current downloading rate for the second video; and
    determining, by the server, the replication indicator for the second video according to the downloading rates for the second video reported by all the peers watching the second video.

12. The method of claim 11, wherein determining the replication indicator comprises:
    calculating an average downloading rate for each video according to the downloading rates for the video reported by all the peers watching the video; and
    determining the replication indicator for each video according to a comparison between the average downloading rate for the video and a predetermined desired rate or range for the video.

13. The method of claim 11, wherein determining the replication indicator comprises:
    calculating a predicted downloading rate for each video according to the downloading rates for the video reported by all the peers watching the video; and
    determining the replication indicator for each video according to a comparison between the predicted downloading rate for the video and a predetermined desired rate or range for the video.

14. The method of claim 11, wherein determining whether the peer is to replace one of the first videos with the second video comprises:
    determining that the peer is to replace one of the first videos with the second video, if the replication indicator for the second video indicates an inadequacy of replication, and the replication indicator for the one of the first videos indicates a redundancy of replication.

15. The method of claim 14, wherein the one of the first videos has a replication indicator indicating a most or largest redundancy of replication.

16. The method of claim 11, wherein determining whether the peer is to replace one of the first videos with the second video comprises:
    determining that no replacement is to be performed by the peer, if either the replication indicator for the second video does not indicate an inadequacy of replication, or the replication indicator for none of the first videos indicates a redundancy of replication.

17. The method of claim 14, further comprising:
updating, by the server, the replication indicators for the second video and the one of the first videos, respectively, after the peer replaces the one of the first videos with the second video.

18. The method of claim 11, wherein each of the peers periodically reports a current downloading rate for each video the peer is watching.

19. The method of claim 18, wherein the server determines the replication indicator for each video periodically.

20. The method of claim 11, wherein the reported downloading rate is a rate for downloading the video from other peers.

21. A server for making a replication decision in a Peer-to-Peer Video-on-Demand (P2P VoD) system, the server comprising:
a storage maintaining a replication indicator for each of a plurality of videos in the system, wherein the replication indicator for each video indicates a redundancy, inadequacy or balance of replication of the video;
a retrieving unit for retrieving, upon receiving from a peer an enquiry with first information regarding one or more first videos of the plurality of videos which are stored in the peer and second information that includes a downloading rate regarding a second video of the plurality of videos which has been viewed at the peer, to the server, the replication indicators for each of the first video and for the second video;
a first determining unit for determining, when the peer does not have enough space to store the second video, whether the peer is to replace at least one of the one or more first videos with the second video according to the retrieved replication indicators, the first information, and the second information;
a calculating unit for calculating an average or predicted downloading rate for each video according to downloading rates included in the second information reported by all peers that are watching the video; and
a second determining unit for determining the replication indicator for each video according to the downloading rates included in the second information, wherein each of the determined replication indicators is stored in the storage.

22. The server of claim 21, wherein the first determining unit determines that the peer is to replace one of the first videos with the second video, if the replication indicator for the second video indicates an inadequacy of replication, and the replication indicator for the one of the first videos indicates a redundancy of replication.

23. The server of claim 22, wherein the one of the first videos has a replication indicator indicating a most or largest redundancy of replication.

24. The server of claim 21, the first determining unit determines that no replacement is to be performed by the peer, if either the replication indicator for the second video does not indicate an inadequacy of replication, or the replication indicator for none of the first videos indicates a redundancy of replication.

25. The server of claim 21, wherein the first determining unit updates the replication indicators for the second video and the one of the first videos, respectively, after the peer replaces the one of the first videos with the second video.

26. The server of claim 21, wherein the second determining unit determines the replication indicator for each video periodically.

27. The server of claim 21, wherein the downloading rate reported by each peer is a rate for downloading the video from other peers.

28. The system of claim 1,
wherein the server determines the replication indicator for the second video by determining a mean of the downloading rates for the second video reported by all the peers at which the second video has been viewed and comparing this mean to a pre-known playback rate; and
wherein the replication indicator for the second video indicates a redundant status when the mean is greater than the pre-known playback rate, wherein the replication indicator for the second video indicates an inadequate status when the mean is less than the pre-known playback rate, and wherein the replication indicator for the second video indicates a balanced status when the mean is equal to the pre-known playback rate.

29. The system of claim 1, wherein the replication indicator for each video is represented by an indicator pair $\{x_j, y_j\}$ where $j=(1, 2, \ldots, M)$ and M is the number of videos stored in the system, and where $x_j$ and $y_j$ represent a positive adjustment and a negative adjustment, respectively, to the number of copies of video j stored in the system.

30. The system of claim 1, wherein when the server receives first information from one of the peers the server updates a first set of information $Q_i$ that is a local video set currently stored on that peer, where $i=(1, 2, \ldots, N)$ and N is the total number of peers in the system, and wherein the server infers the current number of stored copies $c_j$ of a video, where $j=1, 2, \ldots M$ and M equals the total number of videos in the system, the server inferring the current number of stored copies according to the following equation:

$$c_j = \Sigma_{\{i=1 \ to \ N\}} I(Q_i, j)$$

where $I(S, x)=1$ if $j \in S$ and $I(S, x)=0$ otherwise.

31. The method of claim 11,
wherein determining the replication indicator for the second video includes determining a mean of the downloading rates for the second video reported by all the peers at which the second video has been viewed and comparing this mean to a pre-known playback rate; and
wherein the replication indicator for the second video indicates a redundant status when the mean is greater than the pre-known playback rate, wherein the replication indicator for the second video indicates an inadequate status when the mean is less than the pre-known playback rate, and wherein the replication indicator for the second video indicates a balanced status when the mean is equal to the pre-known playback rate.

32. The method of claim 11, wherein the replication indicator for each video is represented by an indicator pair $\{x_j, y_j\}$ where $j=(1, 2, \ldots, M)$ and M is the number of videos stored in the P2P VoD system, and where $x_j$ and $y_j$ represent a positive adjustment and a negative adjustment, respectively, to the number of copies of video j stored in the P2P VoD system.

33. The method of claim 11, wherein when the server receives the first information from one of the peers the server updates a first set of information $Q_i$ that is a local video set currently stored on that peer, where $i=(1, 2, \ldots, N)$ and N is the total number of peers in the system, and wherein the server infers the current number of stored copies $c_j$ of a video, where $j=1, 2, \ldots M$ and M equals the total number of videos in the system, the server inferring the current number of stored copies according to the following equation:

$$c_j = \Sigma_{\{i=1 \ to \ N\}} I(Q_i, j)$$

where $I(S, x)=1$ if $j \in S$ and $I(S, x)=0$ otherwise.

34. The server of claim 21,
wherein the second determining unit determines the replication indicator for the second video by determining a mean of the downloading rates for the second video reported by all the peers at which the second video has been viewed and comparing this mean to a pre-known playback rate; and wherein the replication indicator for the second video indicates a redundant status when the mean is greater than the pre-known playback rate, wherein the replication indicator for the second video indicates an inadequate status when the mean is less than the pre-known playback rate, and wherein the replication indicator for the second video indicates a balanced status when the mean is equal to the pre-known playback rate.

35. The server of claim 21, wherein the replication indicator for each video is represented by an indicator pair $\{x_j, y_j\}$ where $j=(1, 2, \ldots, M)$ and M is the number of videos stored in the P2P VoD system, and where $x_j$ and $y_j$ represent a positive adjustment and a negative adjustment, respectively, to the number of copies of video j stored in the P2P VoD system.

36. The system of claim 21, wherein when the retrieving unit receives the first information from one of the peers the first determining unit updates a first set of information $Q_i$ that is a local video set currently stored on that peer, where $i=(1, 2, \ldots, N)$ and N is the total number of peers in the system, and wherein the first determining unit infers the current number of stored copies $c_j$ of a video, where $j=1, 2, \ldots M$ and M equals the total number of videos in the system, the first determining unit inferring the current number of stored copies according to the following equation:

$$c_j = \Sigma_{\{i=1 \, to \, N\}} I(Q_i, j)$$

where $I(S, x)=1$ if $j \in S$ and $I(S, x)=0$ otherwise.

* * * * *